(12) United States Patent
Kim et al.

(10) Patent No.: US 10,998,539 B2
(45) Date of Patent: May 4, 2021

(54) SECONDARY BATTERY AND METHOD FOR MANUFACTURING THE SAME

(71) Applicant: LG Chem, Ltd., Seoul (KR)

(72) Inventors: Sang Hun Kim, Daejeon (KR); Yong Kim, Daejeon (KR); Yong Su Choi, Daejeon (KR); Hyung Kyun Yu, Daejeon (KR); Soo Ji Hwang, Daejeon (KR); Na Yoon Kim, Daejeon (KR); Min Hyeong Kang, Daejeon (KR)

(73) Assignee: LG Chem, Ltd.

( * ) Notice: Subject to any disclaimer, the term of this patent is extended or adjusted under 35 U.S.C. 154(b) by 118 days.

(21) Appl. No.: 16/332,582

(22) PCT Filed: May 2, 2018

(86) PCT No.: PCT/KR2018/005105
§ 371 (c)(1),
(2) Date: Mar. 12, 2019

(87) PCT Pub. No.: WO2018/208043
PCT Pub. Date: Nov. 15, 2018

(65) Prior Publication Data
US 2020/0127272 A1    Apr. 23, 2020

(30) Foreign Application Priority Data

May 12, 2017   (KR) .................. 10-2017-0059554

(51) Int. Cl.
*H01M 2/02*         (2006.01)
*H01M 2/34*         (2006.01)
(Continued)

(52) U.S. Cl.
CPC ............. *H01M 2/345* (2013.01); *H01M 2/06* (2013.01); *H01M 2/26* (2013.01); *H01M 2/30* (2013.01); *H01M 2200/20* (2013.01)

(58) Field of Classification Search
CPC ........ H01M 2/345; H01M 2/34; H01M 2/347; H01M 2/06; H01M 2/08; H01M 2/26;
(Continued)

(56) References Cited

U.S. PATENT DOCUMENTS 8,449,999 B2 *   5/2013   You .................... H01M 2/1241
                                                        429/56
9,653,721 B2 *   5/2017   Han ...................... H01M 2/30
(Continued)

FOREIGN PATENT DOCUMENTS

CN       101188274 A     5/2008
CN       102082029 A     6/2011
(Continued)

OTHER PUBLICATIONS

Extended European Search Report including Written Opinion for Application No. EP18797573.5 dated Aug. 29, 2019.
(Continued)

*Primary Examiner* — Raymond Alejandro
(74) *Attorney, Agent, or Firm* — Lerner, David, Littenberg, Krumholz & Mentlik, LLP (57) ABSTRACT

A secondary battery is disclosed.
According to the present invention, when an internal pressure exceeding a certain level occurs, current may be interrupted to stop an operation of the secondary battery, thereby preventing the secondary battery from being ignited or exploded by the increase in internal pressure of the secondary battery and improving safety of the secondary battery.

13 Claims, 7 Drawing Sheets

(51) Int. Cl.
*H01M 2/06* (2006.01)
*H01M 2/26* (2006.01)
*H01M 2/30* (2006.01)

(58) Field of Classification Search
CPC ........ H01M 2/266; H01M 2/30; H01M 2/307; H01M 2200/20
See application file for complete search history.

(56) References Cited

U.S. PATENT DOCUMENTS

| | | | |
|---|---|---|---|
| 9,705,153 B2 * | 7/2017 | Lee | H01M 2/12 |
| 10,109,842 B2 | 10/2018 | Ahn et al. | |
| 2011/0086264 A1 | 4/2011 | Tsukamoto et al. | |
| 2011/0136000 A1 * | 6/2011 | Moon | H01M 2/34 429/163 |
| 2016/0149201 A1 | 5/2016 | Min et al. | |
| 2016/0260961 A1 | 9/2016 | Lee et al. | |
| 2017/0110711 A1 | 4/2017 | Ahn et al. | |
| 2017/0117515 A1 | 4/2017 | Ahn et al. | |
| 2018/0053976 A1 | 2/2018 | Park et al. | |

FOREIGN PATENT DOCUMENTS

| | | | |
|---|---|---|---|
| CN | 106601976 A | 4/2017 | |
| EP | 3157074 A1 | 4/2017 | |
| JP | 2008153204 A | 7/2008 | |
| JP | 5389368 B2 | 1/2014 | |
| JP | 6043428 B2 | 12/2016 | |
| JP | 2017076601 A | 4/2017 | |
| KR | 20110048470 A | 5/2011 | |
| KR | 20140141262 A | 12/2014 | |
| KR | 20160125920 A | 11/2016 | |
| KR | 101704129 B1 | 2/2017 | |
| KR | 20170021102 A | 2/2017 | |
| KR | 20170025872 A | 3/2017 | |
| KR | 20170044938 A | 4/2017 | |
| KR | 20170047046 A | 5/2017 | |

OTHER PUBLICATIONS

International Search Report for PCT/KR2018/005105 dated Aug. 10, 2018.

Search Report from Chinese Office Action for Application No. 201880003441.3 dated Mar. 1, 2021; 3 pages.

* cited by examiner

SECONDARY BATTERY AND METHOD FOR MANUFACTURING THE SAME

CROSS-REFERENCE TO RELATED APPLICATION

The present application is a national phase entry under 35 U.S.C. § 371 of International Patent Application No. PCT/KR/2018/005105, filed on May 2, 2018, which claims priority from Korean Patent Application No. 10-2017-0059554, filed on May 12, 2017, all which are hereby incorporated by reference in their entireties.

TECHNICAL FIELD

The present invention relates to a secondary battery and a method for manufacturing the same, and more particularly, to a secondary battery having a structure in which an operation of the secondary battery is stopped when a pressure within the secondary battery increases to improve safety and a method for manufacturing the same.

BACKGROUND ART

Secondary batteries that are repeatedly chargeable and dischargeable generally have a structure in which an electrode assembly including an electrode and a separator is accommodated in an outer case.

Particularly, a secondary battery may include an electrode lead electrically connecting an electrode tab protruding from an electrode assembly to an external electronic device.

When the secondary battery is exposed to an environment or an external impact, a gas may be generated in the secondary battery, and thus, an internal pressure of the secondary battery may increase.

When the internal pressure of the secondary battery increases, the performance of the secondary battery may not be exhibited properly. In particular, when the internal pressure of the secondary battery exceeds a certain level, ignition or explosion may occur in the secondary battery.

Thus, in view of the safety of the secondary battery, it is necessary to provide a secondary battery including a safety device for preparing a case in which the internal pressure of the secondary battery exceeds a certain level.

DISCLOSURE OF THE INVENTION

Technical Problem

Therefore, to solve this problem, an object of the present invention is to provide a secondary battery in which when an internal pressure exceeding a certain level occurs, current is interrupted to stop an operation of the secondary battery, thereby preventing the secondary battery from being ignited or exploded by an increase in internal pressure of the secondary battery and improving safety of the secondary battery.

Technical Solution

According to an aspect of the present invention for achieving the above object, a secondary battery includes: an electrode assembly including an electrode tab; an outer case accommodating the electrode assembly; and an electrode lead electrically connected to the electrode tab, wherein the electrode lead includes: an outer protrusion protruding to the outside of the outer case; an inner connection part disposed in the outer case; an insulation part disposed between the outer protrusion part and the inner connection part; and a notch part disposed on the inner connection part and having a relatively thin thickness when compared to that of the other area of the electrode lead, wherein the notch part is disposed from the electrode assembly toward the outer protrusion, the inner connection part includes: a tab bonding area disposed on one side of the notch part and bonded to the electrode tab; and a tab non-bonding area disposed on the other side of the notch part and connected to the insulation part, wherein the tab bonding area and the tab non-bonding area are bent by using the notch part as an axis to face each other.

The electrode lead may have a ] shape when the inner connection part is unfolded by using the notch part as an axis.

The notch part may have a length corresponding to a width of the inner connection part.

At least a portion of the electrode tab may be disposed between the tab bonding area and the tab non-bonding area.

The notch part may have a shape that is recessed into only one surface of both surfaces of the inner connection part.

The notch part may have a shape that is recessed into both surfaces of the inner connection part.

The notch part may have a thickness that varies in a longitudinal direction of the notch part.

The notch part may have a thickness that gradually decreases closer to the electrode assembly.

The notch part may have a thickness that gradually decreases closer to the outer protrusion.

The notch part may have a thickness that gradually decreases closer to the electrode assembly with respect to a predetermined point of the notch part and that gradually decreases closer to the outer protrusion with respect to the predetermined point of the notch part.

The notch part may have a thickness that gradually increases closer to the electrode assembly with respect to a predetermined point of the notch part and that gradually increases closer to the outer protrusion with respect to the predetermined point of the notch part.

The secondary battery may further include a conductive material having electrical conductivity, which is applied to at least a portion of a surface of the notch part.

The conductive material may have rupture strength less than that of the electrode lead.

Advantageous Effects

According to the present invention, when the internal pressure exceeding a certain level occurs, the current may be interrupted to stop the operation of the secondary battery, thereby preventing the secondary battery from being ignited or exploded by the increase in internal pressure of the secondary battery and improving the safety of the secondary battery.

MODE FOR CARRYING OUT THE INVENTION

Hereinafter, a structure of a secondary battery according to the present invention will be described with reference to the accompanying drawings.

Figure 1:
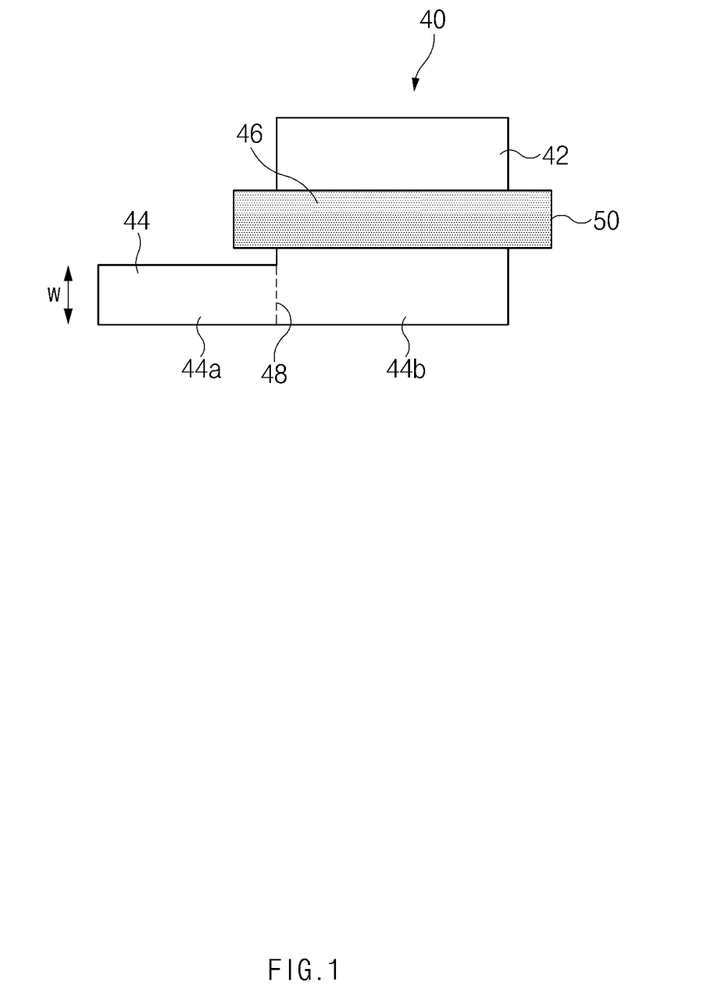
FIG. 1 is a plan view illustrating a structure of an electrode lead of a secondary battery according to an embodiment of the present invention.
Figure 2:
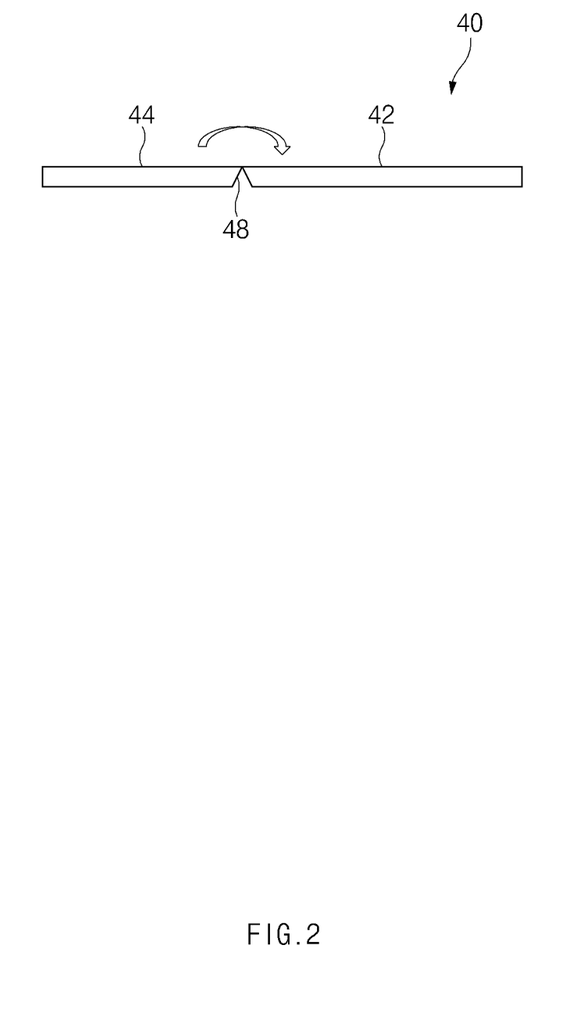
FIG. 2 is a side cross-sectional view of the structure of the electrode lead of the secondary battery according to an embodiment of the present invention.

FIG. 1 is a plan view illustrating a structure of an electrode lead of a secondary battery according to an embodiment of the present invention, and FIG. 2 is a side cross-sectional view of the structure of the electrode lead of the secondary battery according to an embodiment of the present invention.

Figure 3:
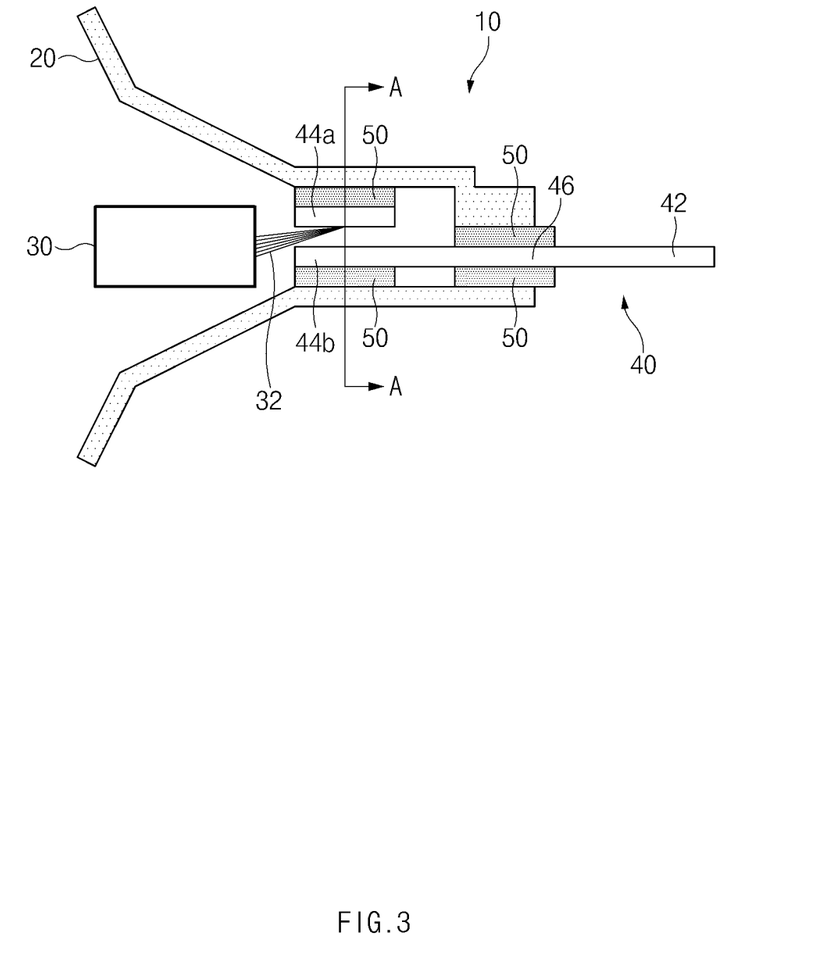
FIG. 3 is a first side cross-sectional view illustrating a connection structure of the electrode lead and an electrode tab in the secondary battery according to an embodiment of the present invention.
Figure 4:
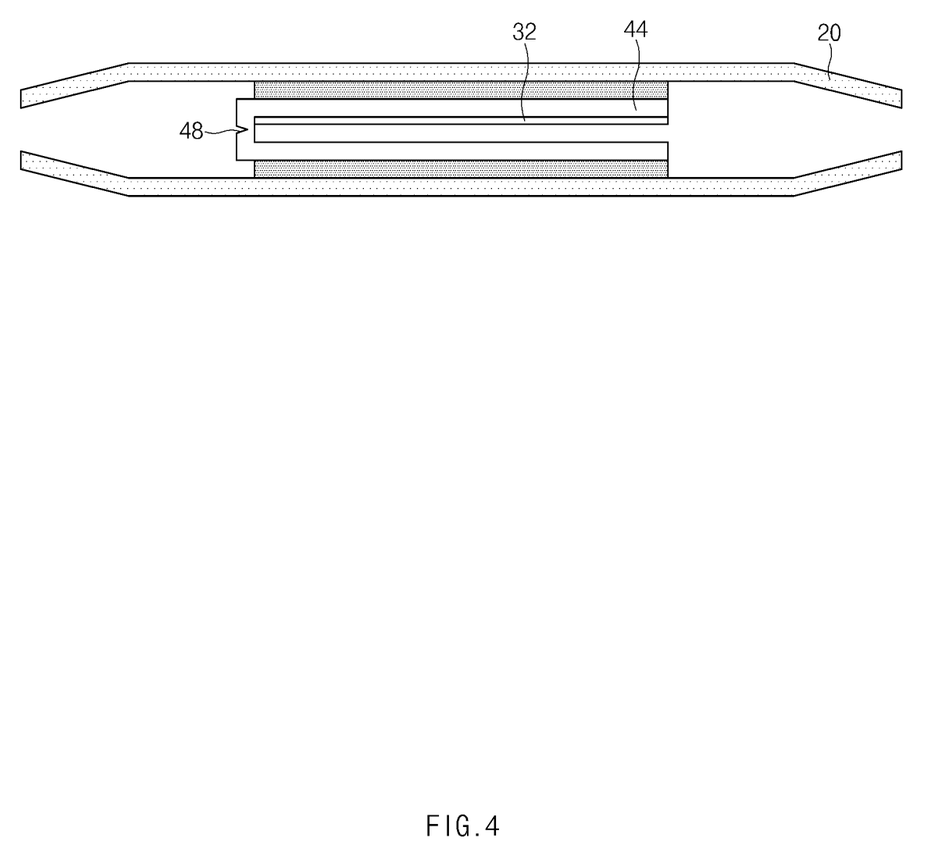
FIG. 4 is a second side cross-sectional view taken along line A-A of FIG. 3.

FIG. 3 is a first side cross-sectional view illustrating a connection structure of the electrode lead and an electrode tab in the secondary battery according to an embodiment of the present invention, and FIG. 4 is a second side cross-sectional view illustrating the connection structure of the electrode lead and the electrode tab when taken along line A-A of FIG. 3 in the secondary battery according to an embodiment of the present invention.

Figure 5:
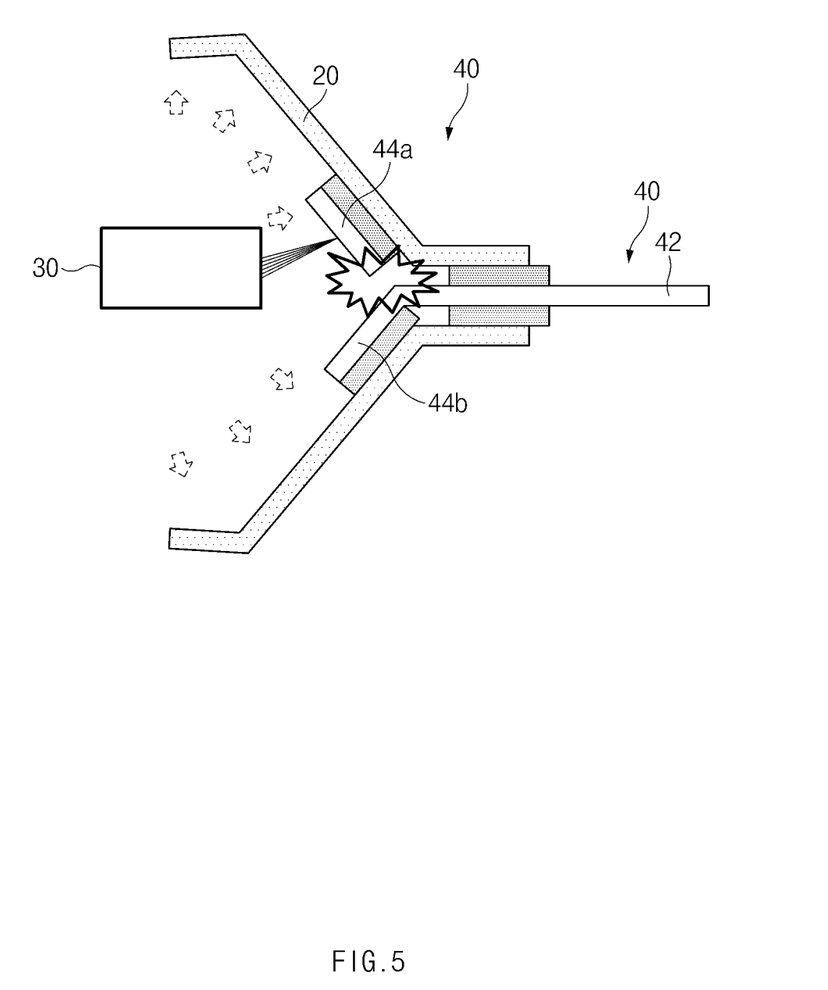
FIG. 5 is a side cross-sectional view illustrating a state in which the connection structure of the electrode lead and the electrode tab is ruptured when an internal pressure of the secondary battery increases in the secondary battery according to an embodiment of the present invention.

Also, FIG. 5 is a side cross-sectional view illustrating a state in which the connection structure of the electrode lead and the electrode tab is ruptured when an internal pressure of the secondary battery increases in the secondary battery according to an embodiment of the present invention.

Referring to FIG. 3, a secondary battery 10 according to an embodiment of the present invention may include an electrode assembly 30 including an electrode and a separator, an electrode tab 32 protruding from the electrode assembly 30, and an outer case 20 accommodating the electrode assembly 30 and the electrode tab 32. Here, the outer case 20 may be a pouch. The secondary battery according to an embodiment of the present invention may be a pouch-type secondary battery.

Continuously, Referring to FIG. 3, the secondary battery 10 may include an electrode lead 40 electrically connecting the electrode assembly 30 to an external device that requires power such as an electronic device. Here, the electrode lead 40 may be electrically connected to the electrode tab 32 protruding from the electrode assembly 30.

Referring to FIG. 1, a portion of the electrode lead 40 of the secondary battery 10 according to an embodiment of the present invention may be provided in the outer case 20, and the other portion may protrude from the outer case. That is, the electrode lead 40 may include an outer protrusion 42 protruding to the outside of the outer case 20, an inner connection part 44 disposed in the outer case 20, and an insulation part 46 disposed between the outer protrusion 42 and the inner connection part 44 and facing the outer case (see reference numeral 20 of FIG. 3). Here, as illustrated in FIGS. 1 and 3, an insulation film 50 for electrically blocking the inside of the secondary battery from the outside of the secondary battery except for the electrode lead 40 may be provided between the insulation part 46 and the outer case 20. As illustrated in FIG. 3, the insulation film 50 may also be provided on an area of the inner connection part 44 facing the outer case.

As illustrated in in FIGS. 1, 2, and 4, a notch part 48 having a relatively thinner thickness than that of the other region of the electrode lead 40 may be formed on the electrode lead 40 of the secondary battery 10 according to an embodiment of the present invention. As illustrated in FIG. 1, the notch part 48 may be formed on the inner connection part 44. Also, as illustrated in FIGS. 1 and 3, the notch part 48 may be formed from the electrode assembly 30 toward the outer protrusion 42.

According to an embodiment of the present invention, since the notch part is formed on the electrode lead, when an internal pressure of the secondary battery increases, the electrode lead may be cut with respect to the notch part. In this case, the electrode assembly (or the electrode tab) and the external device such as the electronic device, which are electrically connected to each other through the electrode lead, may be electrically interrupted to stop an operation of the secondary battery. Thus, the secondary battery may be prevented from increasing in internal pressure to prevent the secondary battery from being ignited or exploded.

Continuously, referring to FIGS. 1 and 3, the inner connection part 44 of the electrode lead 40 may also be divided into an area, which is electrically connected to the electrode tab, and an area, which is not electrically connected to the electrode tab. That is, as illustrated in FIGS. 1 and 3, the electrode lead 40 may include a tab bonding area 44a formed on one side of the notch part 48 and bonded to the electrode tab 32 and a tab non-bonding area 44b formed on the other side of the notch part 48 and connected to the insulation part 46 with respect to the notch part 48. However, this does not mean that the entire tab bonding area 44a is bonded to the electrode tab 32. That is, a portion of the tab bonding area 44a may be bonded to the electrode tab 32. That is, a reference for distinguishing the tab bonding area 44a from the tab non-bonding area 44b may be determined by whether the inner connection part is formed on one side or on the other side opposite to the one side with respect to the notch part 48.

The electrode lead 40 of the secondary battery 10 according to an embodiment of the present invention may have a bent structure. That is, the electrode lead 40 may be bent with respect to the notch part 48. FIGS. 2 to 4 illustrate a structure in which the electrode lead 40 is bent with respect to the notch part 48 so that the tab bonding area 44a and the tab non-bonding area 44b of the inner connection part 44 are disposed to face each other.

According to an embodiment of the present invention, when the notch part is formed from the electrode assembly toward the outer protrusion, and simultaneously, the electrode lead is bent with respect to the notch part, if the internal pressure of the secondary battery increases, the electrode lead may be more quickly cut, and also, utilization of the internal space of the secondary battery may increase.

Basically, when a short-circuit phenomenon or the like occurs in the secondary battery, the electrode assembly accommodated in the secondary battery increases in temperature, and thus, a gas is generated in the secondary battery, thereby increasing in internal pressure of the secondary battery. Thus, in order to quickly cut the electrode lead, the notch portion needs to be close to the electrode assembly. This is done because the area on which the internal pressure of the secondary battery most suddenly and most abruptly changes is the area around the electrode assembly.

Thus, if the notch part is formed in a direction perpendicular to a direction that is directed from the electrode assembly toward the outer protrusion in the electrode assembly unlike an embodiment of the present invention, since the notch part is away from the electrode assembly, it may be difficult to efficiently cut the electrode lead in the notch part.

On the other hand, when the notch part is formed from the electrode assembly toward the outer protrusion like an embodiment of the present invention, one side of the notch part may be relatively close to the electrode assembly and thus may be efficiently cut. In this case, although the other side of the notch is further spaced apart from the electrode assembly, the cutting of the notch part may be extended from one side of the notch part to the other side of the notch part once cutting starts at one side of the notch part, so that the electrode lead may be efficiently cut as a result (see FIG. 5).

FIG. 5 illustrates a state in which the notch part 48 is cut by force of a generated gas when the gas is generated in the secondary battery due to a short-circuit phenomenon or the like in the secondary battery. When the notch part is cut, the tab bonding area 44a to which the electrode tab 32 is bonded and the tab non-bonding area 44b to which the electrode tab 32 is not bonded may be separated from each other. Thus, the electrode tab 32 may be electrically completely separated from the outer protrusion 42 connected to the external device. As a result, abnormal current flowing through the electrode lead 40 may be interrupted to promote safety of the battery.

Also, when the electrode lead is bent with respect to the notch part like an embodiment of the present invention, an area occupied by the electrode lead may be minimized in the internal space of the secondary battery to improve utilization of the internal space of the secondary battery.

In this specification, the term 'bent' may be replaced with a term 'folded'. Here, 'bent' may mean that the electrode lead is folded with respect to the notch part. Also, 'folded' may mean that the electrode lead is folded at an angle of about 180 degrees with respect to the notch part so that the tab bonding area and the tab non-bonding area face each other. That is, 'bent' may be a concept that includes 'folded'.

Continuously, referring to FIG. 1, the electrode lead 40 may have a ] shape (in the form of an L-letter in alphabet) when the inner connection part 44 bent by using the notch part 48 as an axis is unfolded. Here, it may be understood that the tab bonding area 44a has a shape that protrudes from the outer protrusion 42, the insulation part 46, and the tab non-bonding area 44b. Also, it may be understood that the outer protrusion 42 and the insulation part 46 has a shape that protrudes from the inner connection part 44.

Also, the notch part 48 may be formed with a length corresponding to a width W of the inner connection part 44. When the notch part 48 is formed with a length corresponding to a width of the inner connection part 44, if the internal pressure of the secondary battery 10 increases, cutting of the electrode lead 40 may be completely performed.

Also, as illustrated in FIG. 3, at least a portion of the electrode tab 32 may be disposed between the tab bonding area 44a and the tab non-bonding area 44b. Here, the electrode tab 32 may contact the tab bonding area 44a, but may not contact the tab non-bonding area 44b. When the electrode tab 32 contacts the tab non-bonding area 44b, the electrode lead 40 and the electrode tab 32 may be continuously electrically connected to each other even though the notch part 48 is cut due to the increase of the internal pressure of the secondary battery 10.

Figure 6A:
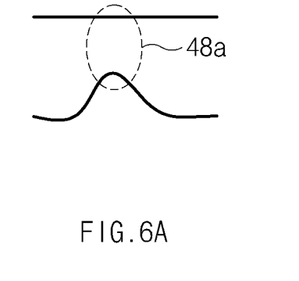
FIGS. 6A to 6C are side cross-sectional views illustrating a shape of a notch part formed on one surface or both surfaces of an inner connection part of the secondary battery according to an embodiment of the present invention.
Figure 6B:
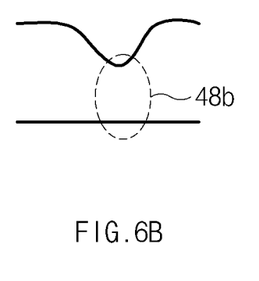
Figure 6C:
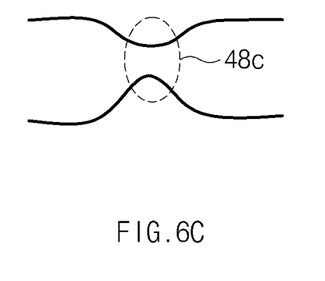

FIGS. 6A to 6C are side cross-sectional views illustrating a shape of a notch part formed on one surface or both surfaces of an inner connection part of the secondary battery according to an embodiment of the present invention.

As illustrated in FIGS. 6A and 6B, each of the notch parts (48a to 48c) may have a shape that is recessed into only one surface of both surfaces of the inner connection part. In more detail, as illustrated in FIG. 6A, the notch part 48a may have a shape that is recessed into only a bottom surface of both surfaces of the inner connection part. Alternatively, as illustrated in FIG. 6B, the notch part 48b may have a shape that is recessed into a top surface of both surfaces of the inner connection part. Alternatively, as illustrated in FIG. 6C, the notch part 48c may have a shape that is recessed into both surfaces of the inner connection part.

Figure 7A:
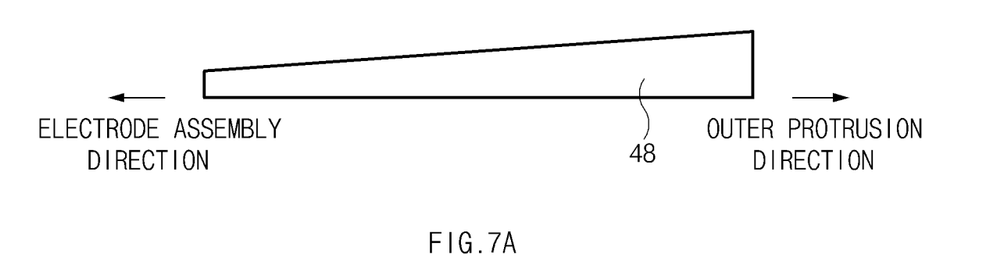
FIGS. 7A and 7B are side cross-sectional views illustrating a notch part having a thickness that varies in a longitudinal direction of the notch part according to an embodiment of the present invention.
Figure 7B:
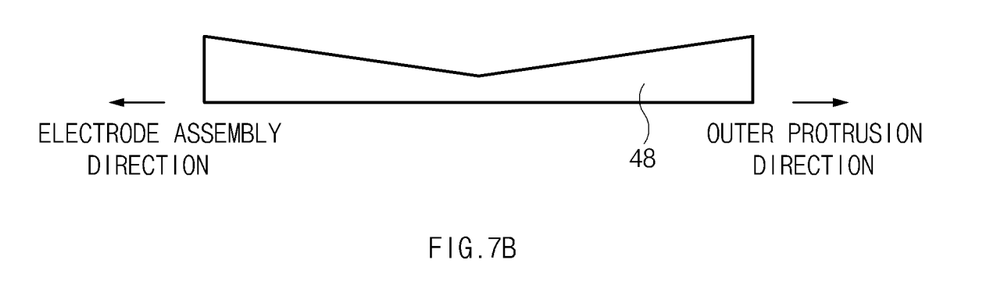

FIGS. 7A and 7B are side cross-sectional views illustrating the notch part having a thickness that varies in a longitudinal direction of the notch part according to an embodiment of the present invention.

As illustrated in FIGS. 7A and 7B, the notch part 48 may have a thickness varying in a longitudinal direction of the notch part 48.

For example, as illustrated in FIG. 7A, the notch part 48 may have a thickness that gradually decreases closer to the electrode assembly. In cases in which the notch part 48 has a thickness that gradually decreases closer to the electrode assembly (particularly, around the electrode assembly), an effect that may be obtained is that cutting of the electrode lead due to the rupture of the notch part quickly occurs. On the other hand, the notch part may have a thickness that gradually decreases closer to the outer protrusion. When the notch part has a thickness that gradually decreases closer to the outer protrusion, since a time taken to rupture the notch part is uniformly spent over the entire area when the internal pressure of the secondary battery increases, cutting of the electrode lead may be completely performed over a short time period.

As illustrated in FIG. 7B, the notch part 48 has a thickness that gradually increases closer to the electrode assembly with respect to a predetermined point of the notch part 48 and also has a thickness that gradually increases closer to the outer protrusion with respect to the predetermined point of the notch part 48. Alternatively, on the other hand, the notch part 48 has a thickness that gradually decreases closer to the electrode assembly with respect to a predetermined point of the notch part 48 and also has a thickness that gradually decreases closer to the outer protrusion with respect to the predetermined point of the notch part 48.

As described above, according to an embodiment of the present invention, since the notch part is formed on the electrode lead, when the internal pressure of the secondary battery increases, cutting of the electrode lead may be efficiently performed to improve the safety of the secondary battery. However, since the electrode lead has a relatively thin thickness at the notch part, electrical resistance may relatively increase. This may mean that power consumption is relatively large in the electrode lead, particularly the notch part, and also, a temperature in the notch part is relatively high.

Thus, according to another embodiment of the present invention, a conductive material having electrical conductivity may be applied to at least a portion of a surface of the notch part. For example, the conductive material may be applied to the surface of the notch part so that the electrode lead has a uniform thickness on the whole. Since the conductive material is applied to at least a portion of the surface of the notch part, the problem in which the electrical resistance increases in the notch part may be solved. However, even in this case, since it is still necessary to effectively rupture the notch part when the internal pressure of the secondary battery increases, the conductive material may have relatively weak strength when compared to that of the material forming the electrode lead. The rupture strength of the conductive material according to another embodiment of the present invention may be relatively less than that of the electrode lead.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A secondary battery comprising:
an electrode assembly comprising an electrode tab;
an outer case accommodating the electrode assembly; and
an electrode lead electrically connected to the electrode tab,
wherein the electrode lead comprises:
an outer protrusion protruding to the outside of the outer case;
an inner connection part disposed in the outer case;
an insulation part disposed between the outer protrusion part and the inner connection part; and
a notch part disposed on the inner connection part and having a relatively thin thickness when compared to that of the other area of the electrode lead,
wherein the notch part is disposed from the electrode assembly toward the outer protrusion,
the inner connection part comprises:
a tab bonding area disposed on one side of the notch part and bonded to the electrode tab; and
a tab non-bonding area disposed on the other side of the notch part and connected to the insulation part,
wherein the tab bonding area and the tab non-bonding area are bent by using the notch part as an axis to face each other.

2. The secondary battery of claim 1, wherein the electrode lead has a ] shape when the inner connection part is unfolded by using the notch part as an axis.

3. The secondary battery of claim 2, wherein the notch part has a length corresponding to a width of the inner connection part.

4. The secondary battery of claim 1, wherein at least a portion of the electrode tab is disposed between the tab bonding area and the tab non-bonding area.

5. The secondary battery of claim 1, wherein the notch part has a shape that is recessed into only one surface of both surfaces of the inner connection part.

6. The secondary battery of claim 1, wherein the notch part has a shape that is recessed into both surfaces of the inner connection part.

7. The secondary battery of claim 1, wherein the notch part has a thickness that varies in a longitudinal direction of the notch part.

8. The secondary battery of claim 1, wherein the notch part has a thickness that gradually decreases closer to the electrode assembly.

9. The secondary battery of claim 1, wherein the notch part has a thickness that gradually decreases closer to the outer protrusion.

10. The secondary battery of claim 1, wherein the notch part has a thickness that gradually decreases closer to the electrode assembly with respect to a predetermined point of the notch part and that gradually decreases closer to the outer protrusion with respect to the predetermined point of the notch part.

11. The secondary battery of claim 1, wherein the notch part has a thickness that gradually increases closer to the electrode assembly with respect to a predetermined point of the notch part and that gradually increases closer to the outer protrusion with respect to the predetermined point of the notch part.

12. The secondary battery of claim 1, further comprising a conductive material having electrical conductivity, which is applied to at least a portion of a surface of the notch part.

13. The secondary battery of claim 12, wherein the conductive material has a rupture strength less than that of the electrode lead.

* * * * *